March 1, 1966     A. J. KASAK     3,237,874

MOTION TRANSMITTING APPARATUS

Filed May 17, 1962     5 Sheets-Sheet 1

INVENTOR.
ANTONIN J. KASAK

ATTORNEY

INVENTOR.
ANTONIN J. KASAK

ATTORNEY

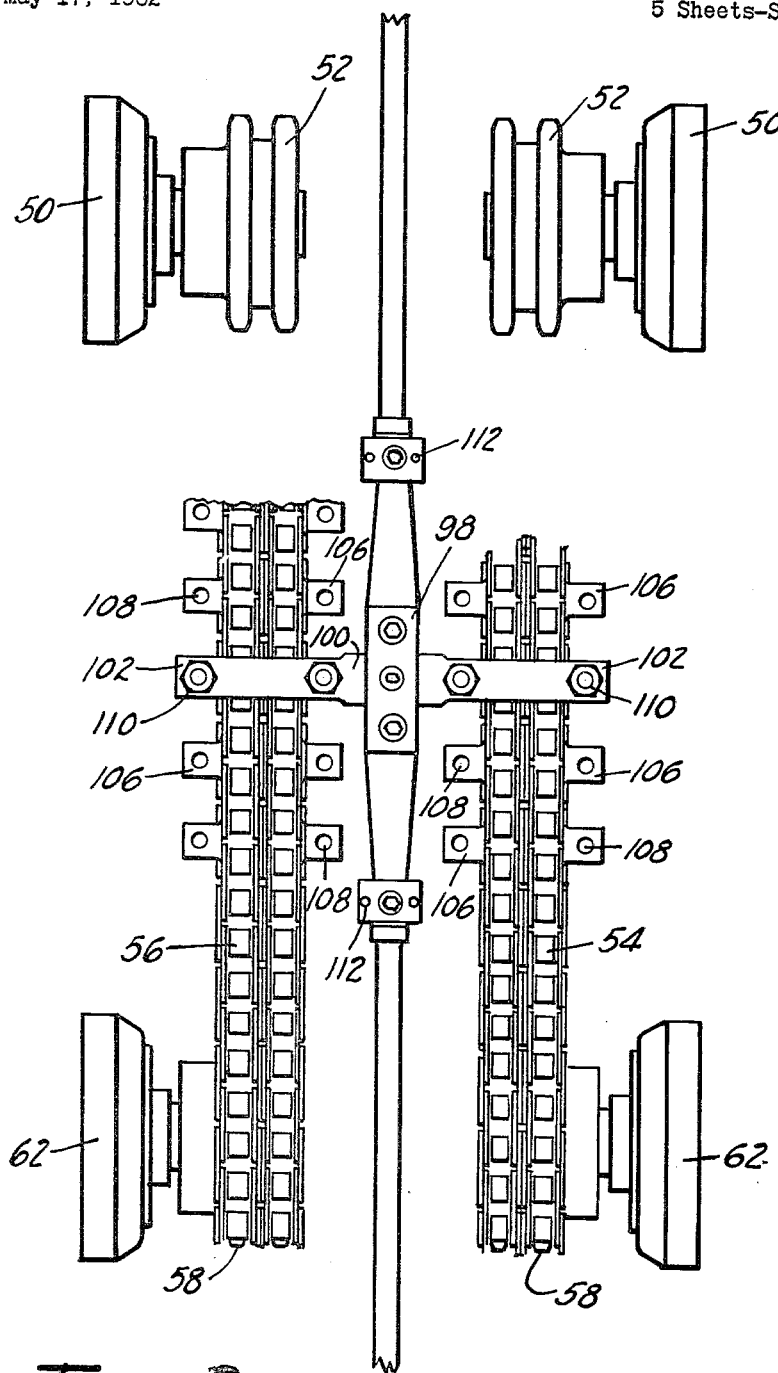

March 1, 1966        A. J. KASAK        3,237,874
MOTION TRANSMITTING APPARATUS

Filed May 17, 1962        5 Sheets-Sheet 4

INVENTOR.
ANTONIN J. KASAK
BY
ATTORNEY

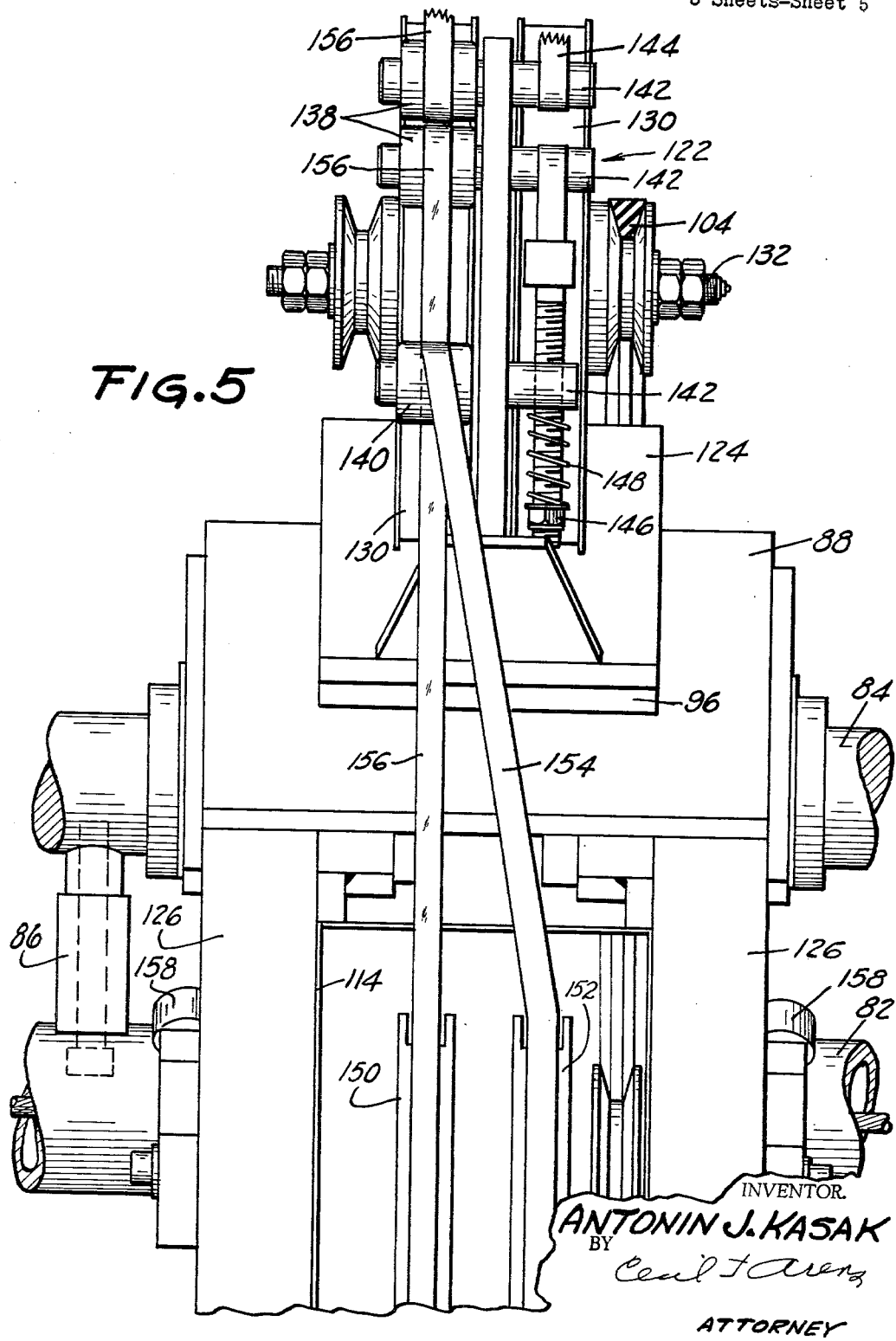

United States Patent Office 3,237,874
Patented Mar. 1, 1966

3,237,874
MOTION TRANSMITTING APPARATUS
Antonin John Kasak, South Bend, Ind., assignor to The Bendix Corporation, South Bend, Ind., a corporation of Delaware
Filed May 17, 1962, Ser. No. 195,469
4 Claims. (Cl. 242—7)

The present invention is primarily concerned with imparting reciprocating motion to an endless member wherein the deceleration, stopping and reacceleration reversing the travel of said element is controllable and equated to a sine function. The object of the present invention is to provide a mechanism whereby rotary motion may be converted into an elongated reciprocatory motion of any desired extent of travel.

Another object of this invention is to provide a mechanism whereby unidirectional motion may be converted into an elongated reciprocatory motion of any desired extent of travel.

It is also an object of this invention to impart reciprocating movement to a driven member pursuant to the rotation of a driving member by simple and efficient mechanism.

An additional object of this invention is to provide mechanism for converting rotary motion to reciprocal motion of any length, which reciprocal motion has its rate of reversal controlled.

Mechanism in accordance with the present invention may be employed for operating a wide variety of devices or other mechanisms, but it is particularly intended for operating a tape winding head and elevating type platforms capable of handling high density loads such as fork lift trucks, building elevators and vehicle loading platforms.

Other objects and features of the invention will become apparent from a consideration of the following description, which proceeds with reference to the accompanying drawings; wherein:

FIGURE 3 is a detailed view of a connector assembly for imparting reciprocatory motion to an endless element;

FIGURE 5 is an exploded view of the tape tensioning and supply mechanism mounted to the reciprocating head of FIGURE 1;

FIGURE 8 is a sectional view taken on line 8—8 of FIGURE 1.

Figure 1:
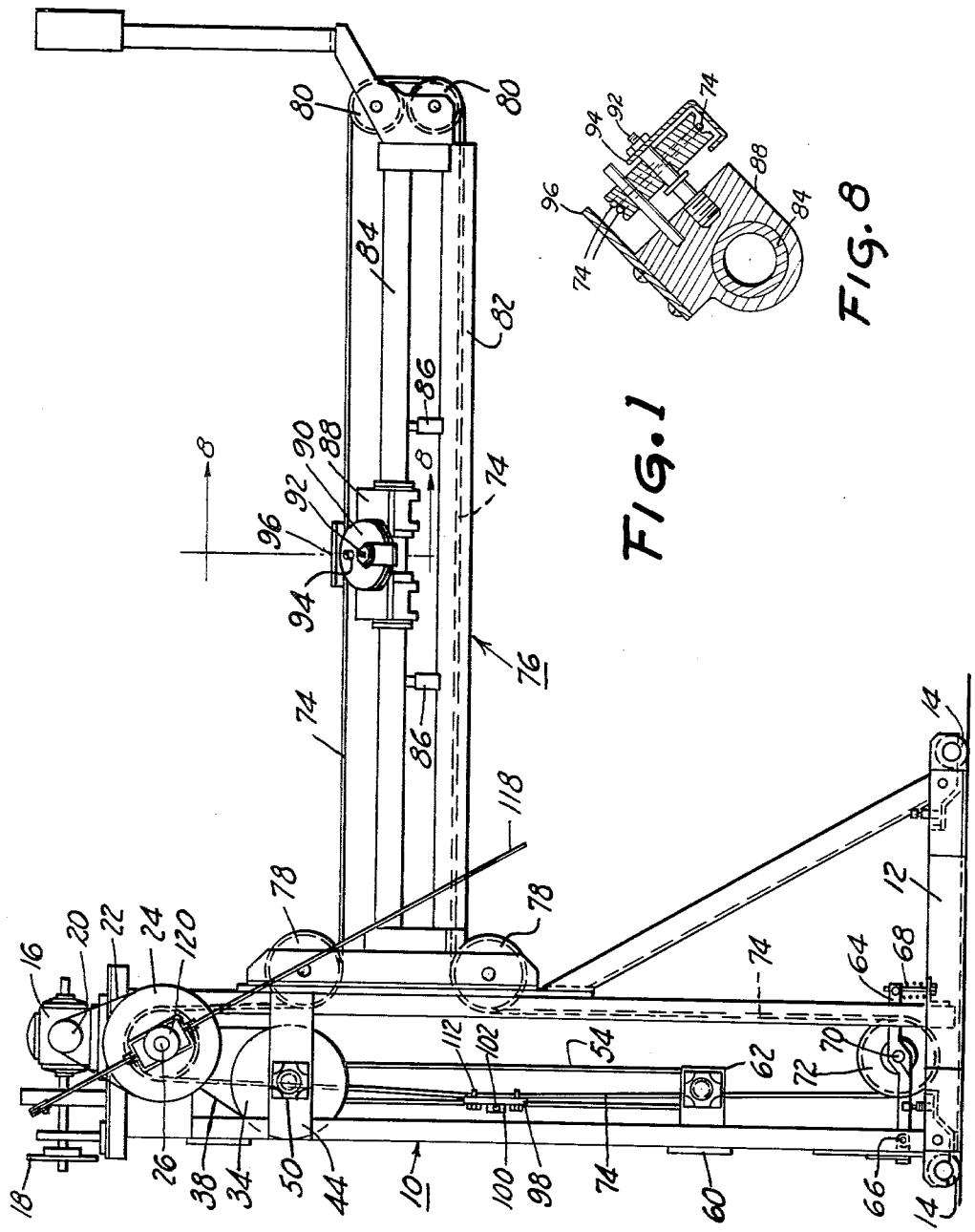
FIGURE 1 is a side view of the mechanism in accordance with the present invention.

With reference to FIGURE 1, a portable embodiment of my invention is shown having a box-like structure 10 with a base member 12 riding on rotatable rollers 14 when they are lowered. At the top of the rectangular frame 10 a miter gear transmission box 16 is mounted by any appropriate means. The transmission box 16 is provided with a driven member 18 and a drive member 20. The driven member 18 may be connected, as by drive link 19 having a tension adjusting idler pulley 21, to any appropriate power means such as an electrical motor shown schematically at 23; whereas the drive member 20 is connected by a drive link 22 to a rotatable member 24. Thus, the reciprocating motion created is synchronized with the power means. As may be readily understood, a speed variance may be provided by increasing or decreasing the respective sizes of the drive member 20 or the driven member 24. The member 24 is connected to a shaft 26 which drivingly mounts a pair of sprockets 28 and 30 and rotatably mounts a pulley 32, which rotatable mount permits pulley 32 to rotate irrespective of the shaft 26. The sprockets 28 and 30 are connected to another pair of sprockets 34 and 36, respectively, as by chains 38, as may be more readily seen in FIGURE 2. The sprockets 34 and 36 are mounted to shafts 40 and 42, respectively, to drive said shafts. The shafts 40 and 42 are mounted to the box member by plates 44 and 46 such that the shafts 40 and 42 are free to be driven by the sprockets 34 and 36. As may be readily appreciated by those skilled in the art, any type of bearing means may permit such rotation such as the bearing blocks 50 shown by FIGURES 1 and 2. The shafts 40 and 42 drivingly mount sprockets 52, which sprockets respectively drive chain assemblies 54 and 56 about an additional pair of sprockets 58 also carried by the box member 10 as by a plate 60 having bearing blocks 62. The pulley 32 is centered with respect to chains 54 and 56 and held on shaft 26 by collars 59. It is to be noted that the mounting assembly 60 may be positioned on the box member at any distance from the sprockets 52, thus varying the length of the chain assemblies 54 and 56 to increase or decrease the reciprocal motion as will be hereinafter explained.

The box frame member 10 also pivotally carries an arm 64 which may be yieldingly held opposite its pivotal mounting 66 as by a spring bolt assembly 68. The arm 64 rotatably mounts a shaft 70 which carries a pulley 72. Between the pulley 32 and the pulley 72 an endless cable 74 is provided. The endless cable 74 may also be extended laterally from the box members as by the structure 76 mounted thereto which comprises a pair of pulleys 78 carried by the box member and an additional pair of pulleys 80 at the end of the laterally extending structure 76. In one form the structure 76 may also comprise a tubular member 82 and a rod 84 which are connected at the furthest end from the box structure 10 by any appropriate means as well as intermediate thereof. The structure 76 may also be of telescoping construction to permit larger reciprocating motions. One form of attaching the tubes may be by the tubular structures 86 as seen in FIGURE 1. The rod 84 is provided with a sliding member 88 which includes a means for attaching the endless cable 74 to the member 88. This means of attachment includes a disc 90 rotatably mounted to the member 88 as by the shaft 92. The rotation of disc 90 adjusts the location member 88 by the winding of cable 74 simultaneously on and off said disc. In order to fix the position of the disc 90 a pin 94 is provided which extends through the disc 90 into an appropriate bore or hole within the member 88 (see FIGURE 8). Thus it may be readily appreciated that the member 88 may be variably positioned along the rod 84 by rotating the disc 90 before locking the disc to the sliding member 88. In addition, if a cable of determinant length is utilized the ends are fastened by disc 90 and the length of cable 74 is varied by increasing the wraps about the disc 90. The sliding member 88 also has provisions in the form of a flange 96 for mounting a tape head or a platform, as will be hereinafter discussed.

In order that the endless cable 74 may have reciprocating motion imparted to it, a connector 98 is attached to the cable 74 by "U" bolts 112. Connector 98 is mounted to a split bearing 100 through which arm 102 extends. The chains 54 and 56, seen in FIGURE 3, are constructed of a pair of chains and are provided with lugs 106 attached to the outside portions of said chains, such as by the pins connecting the side links of the respective chains. The lugs 106 are bored as at 108, and the arm 102 of the connector 98 is likewise bored so that the lugs 106 and arm 102 may be connected by a familiar bolt and nut-type connector 110, as seen in FIGURE 3. As the arm 102 rests on top of the chains 54 and 56, it may be readily directed about the sprockets 52 and 58; and as the arm 102 is rotatably mounted to the connector 98 by the center bearing portion 100, the cable 74 will merely reverse directions upon passing about the sprockets 52 and 58 while the arm 102 merely rotates in bearing 100.

Between the sprockets 52 and 58 and the transmission 16, a clutch 116 is provided. More particularly, the clutch 116 is mounted to the sprocket 24 between it and the shaft 26 so that the sprocket 24 may rotate under the direction of the transmission 16 without rotating the shaft 26. In order to rotate shaft 26, a lever 118 is provided which rotatably carries an element 120 which upon movement of the lever 118 in the leftward direction, as viewed in FIGURE 2, causes the clutch 116 to engage the sprocket 24 and thereby drive shaft 26.

Figures 2, 6:
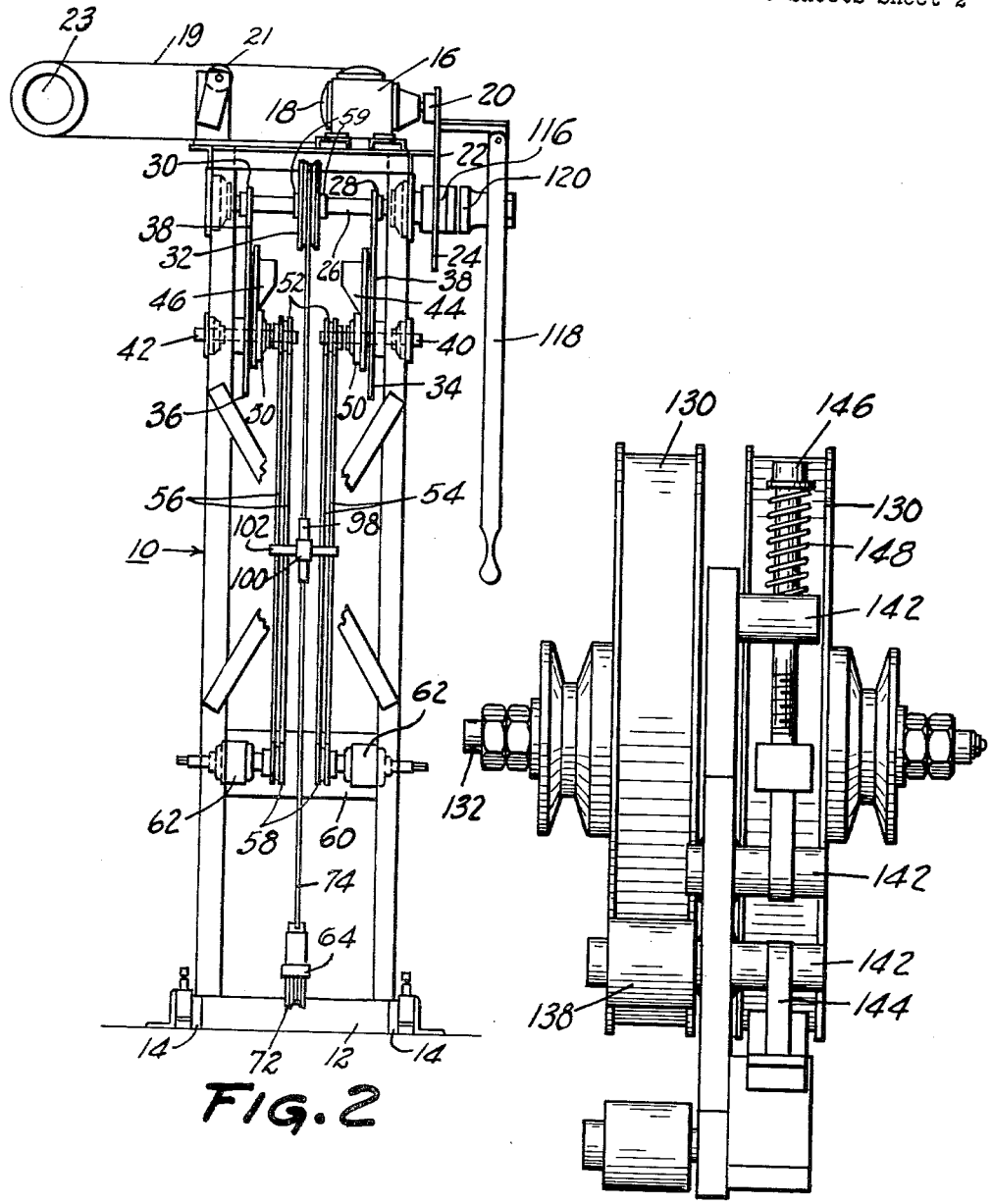
FIGURE 2 is an end view of the mechanism of FIGURE 1 with parts broken away for clarity.
FIGURE 6 is an end view of the tape tensioning provisions of said tape supply mechanism.
Figure 4:
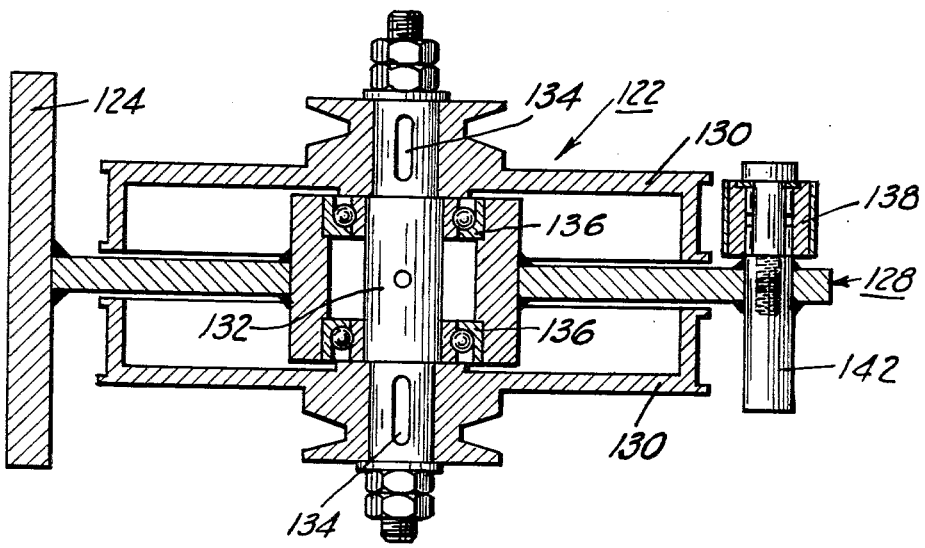
FIGURE 4 is a tape supply mechanism which may be mounted to the reciprocating head of the mechanism of FIGURE 1.

In order to use the reciprocating member 88 in wrapping rocket cases, a tape supply means, as seen in FIGURES 4 and 5, is mounted to the structure. In particular, the tape feeding device 122 of FIGURE 4 is mounted by attaching base plate 124 to flange 96, as by appropriate means such as bolts, not shown, to the sliding member 88; and a tape supply means 114 is slidably mounted along the tube 82 by the projections 126. The tape head 122 consists of a mounting "T" structure 128, which "T" structure rotatably carries a pair of drums 130, one of which is driving and the other of which is braking, and both of which are keyed to a shaft 132 as at 134, which shaft is bearingly supported within the "T" structure 128, including the base plate 124, as by the bearings 136. The supporting "T" structure also carries a pair of guide rollers 138 and an additional guide roller 140 which are in alignment with one of the drums 130 as seen in FIGURES 4, 5, and 6, and a plurality of pins 142 which are in alignment with the other of said drums 130 as also seen in the mentioned figures. The pins 142 function as tensioning devices for a brake band 144 that is spring tensioned by the bolt 146 and spring 148. The tape supply means 114 of FIGURES 5 and 6 contains a freely rotating reel 150 of tape and a driven wheel 152 which wheel 152 is driven by belt 104 from shaft 132 and serves to remove and store the tape leader 154 from the tape 156. The tape leader 154 is conventional in that it is a continuous strip of any suitable backing material which is applied to one side of tape 156 and wound therewith upon reel 150 to separate each layer of tape 156 from its adjacent layers. Of course, the tape leader 154 must be removed from the tape 156 as shown in FIGURE 5 as the tape 156 is unwound from reel 150 during the rocket case wrapping procedure. In addition, the tape supply housing is mounted to tube 82 and slides therealong due to the rollers 158 and the mounting of the projections 126 to the slidable member 88 as by any appropriate means such as bolts or the like.

Figure 7:
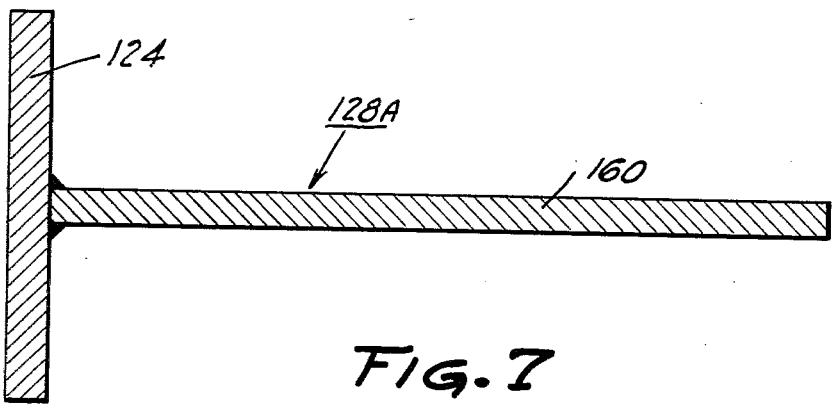
FIGURE 7 is a platform which may be mounted to the reciprocating head of the mechanism of FIGURE 1.

As for the embodiment of my invention in connection with elevating a load or the like, it may be best visualized by assuming the box frame structure 10 as being in a horizontal position with the reciprocating support network 76 being in a vertical position. Once this has been assumed it is then but a simple step to mount a platform 160 to the base plate 124 to form "T" structure 128a such as seen in FIGURE 7 to the boss 96 of the sliding member 88. Thereafter, a load may be placed on platform 160 and raised or lowered by reciprocating sliding member 88, which reciprocation will be hereinafter detailed with regard to the tape mechanism aforedescribed.

In operation, the chains 54 and 56 are driven upon energization of the clutch 116 which in turn drives the connector 98 through its pivot bearing 100. The driving of the connector 98 sets in motion the endless cable 74 which reciprocates along the chain length and moves the member 88 along the tube 82 and rod 84. The distance that the member 88 may travel along the rod 84 may be varied by several means. For example, the length of the chains 54 and 56 may be varied to alter the reciprocation of member 88. In addition, the rate of deceleration, stopping and reacceleration of the sliding member 88 as it approaches its extreme positions may be varied by increasing or decreasing the diameter of the sprockets 52 and 58. With larger diameter sprockets, the member 88 will slow down and reaccelerate more gradually than it would with smaller diameter sprockets. As may also be readily appreciated, the deceleration stopping and reacceleration in a reverse direction may vary with respect to each end by merely varying the size of the sprocket at one end only.

As those skilled in the art may readily depart from the structure above-described in carrying out the intent of my invention, I do not propose to be limited by the foregoing description but rather by the appended claims which truly sets forth the scope and character of my invention.

I claim:

1. A machine for supplying tape to a rocket casing or the like about which the tape is wrapped, said machine being adapted to provide reciprocating motion to the tape and comprising:
    a pair of spaced apart chain drives each having a pair of spaced apart sprockets;
    motor means operatively connected to one of the two sprockets in each of said pair for driving the same;
    an endless cable operatively connected to said pair of chain drives and adapted to follow the movement of said chain drives about said sprockets which movement imparts reciprocation motion to said endless cable;
    elongated support means having pulley means at one end thereof which receive and guide said endless cable;
    a slidable member carried by said elongated support means and adapted to carry a supply of tape for use in wrapping the casing;
    a rotatable member carried by and movable with said slidable member; and
    locking means operatively connected to said rotatable member and said slidable member for fixing the relative positions thereof;
    said slidable member being adjustable along said elongated support means by removing said locking means and rotating said rotatable member to a desired position at which position said locking means is replaced to fix the relative positions of said rotatable member and said slidable member.

2. A machine as claimed in claim 1 wherein said slidable member is adapted to carry a tape supply reel rotatably carried thereon, a tape leader take-up reel rotatably carried thereon, and a means to tension the tape drawn from said supply reel.

3. An apparatus for changing rotary motion to reciprocating motion comprising:
    a pair of spaced apart chain drives each having a pair of spaced apart sprockets;
    motor means operatively connected to one of the two sprockets in each of said pair for driving the same;
    an endless cable operatively connected to said pair of chain drives and adapted to follow the movement of said chain drives about said sprockets which movement imparts reciprocation motion to said endless cable;
    elongated support means having pulley means at one end thereof which receive and guide said endless cable;
    a slidable member carried by said elongated support means for reciprocation motion thereon;
    a rotatable member carried by and movable with said slidable member and about which a portion of said endless cable is wrapped; and locking means operatively connected to said rotatable member and said slidable member for fixing the relative positions thereof;

said slidable member being adjustable along said elongated support means by removing said locking means and rotating said rotatable member to a desired position on said elongated support means at which position said locking means is replaced to fix the relative positions of said rotatable member and said slidable member.

4. An apparatus as claimed in claim 3 wherein:

said elongated support means is a shaft slidably carrying said slidable member for longitudinal movement thereon over a portion of the length thereof in accordance with the stroke of reciprocation imparted to said endless cable;

said portion of the length of said shaft being displaced longitudinally along said shaft in accordance with said desired position to which said slidable member is adjusted.

References Cited by the Examiner

UNITED STATES PATENTS

| 2,364,696 | 12/1944 | Crom | 242—7 |
| 2,514,350 | 7/1950 | Pianta | 74—37 |
| 2,662,703 | 12/1953 | Brown | 242—158 |
| 2,653,022 | 9/1953 | Armstrong | 74—37 X |
| 2,663,341 | 12/1953 | Grove | 74—37 X |

FOREIGN PATENTS

| 657,194 | 9/1951 | Great Britain. |

MERVIN STEIN, *Primary Examiner.*

HARRISON R. MOSELEY, *Examiner.*